(12) United States Patent
Wei et al.

(10) Patent No.: US 9,672,952 B2
(45) Date of Patent: Jun. 6, 2017

(54) POLYMER AND CONDUCTIVE COMPOSITION

(71) Applicant: INDUSTRIAL TECHNOLOGY RESEARCH INSTITUTE, Hsinchu (TW)

(72) Inventors: Ching-Yen Wei, Taipei (TW); Gue-Wuu Hwang, Hsinchu (TW); Yung-Chien Fu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 221 days.

(21) Appl. No.: 14/458,795

(22) Filed: Aug. 13, 2014

(65) Prior Publication Data

US 2015/0048278 A1 Feb. 19, 2015

Related U.S. Application Data

(60) Provisional application No. 61/865,776, filed on Aug. 14, 2013.

(30) Foreign Application Priority Data

Dec. 30, 2013 (TW) .............................. 102148967 A
Aug. 13, 2014 (TW) .............................. 103127727 A

(51) Int. Cl.
  *C08G 61/00* (2006.01)
  *C08F 18/00* (2006.01)
  (Continued)

(52) U.S. Cl.
  CPC ............. *H01B 1/125* (2013.01); *C08F 28/00* (2013.01); *C08G 61/00* (2013.01)

(58) Field of Classification Search
  CPC ........ H08G 61/00; H08G 61/02; C08F 18/00; C08F 18/14; C08F 18/20; C08G 61/00; C08G 61/02
  See application file for complete search history.

(56) References Cited

U.S. PATENT DOCUMENTS 4,960,754 A   10/1990  Wilson et al.
5,177,255 A   1/1993   Bader et al.
(Continued)

FOREIGN PATENT DOCUMENTS

| CN | 102516784 A | 6/2012 |
| CN | 102731971 A | 10/2012 |
| JP | 2000-6491 A | * 1/2002 |
| KR | 20100087924 A | 8/2010 |
| TW | I228973 B | 3/2005 |
| TW | 201124171 A | 7/2011 |
| TW | 201127411 A1 | 8/2011 |
| TW | 201217405 A | 5/2012 |

OTHER PUBLICATIONS

Chinese Office Action dated Sep. 1, 2016, as issued in corresponding China Patent Application No. 201410352537.4 (5 pages).
The citation was first cited in the Office Action issued on May 28, 2015 for the corresponding application No. 103127727 in Taiwan (1-5 pages).
Subbiah Ananthalakshmi et al., "Kinetic Investigation on the Reactions of p-Toluenesulfonyl Chloride with p-Substituted Benzoic Acid(s) in the Presence of Triethylamine in Aprotic Solvents", 2009 Wiley Periodicals, In. Int. J. Chem. Kinet. 41, pp. 303-308. 2009.
Shirou Maeda et al., "Studies on the preparation of bioactive lignans by oxidative coupling reaction. III. Synthesis of polyphenolic benzofuran and coumestan derivatives by oxidative coupling reaction of methyl (E)-3-(4-hydroxy-2-methoxyphenyl)propenoate and their inhibitory effect on lipid peroxidation", Chem. Pharm. Bull. 42(12), pp. 2536-2545. 1994.

(Continued)

*Primary Examiner* — Mark Kopec
(74) *Attorney, Agent, or Firm* — Muncy, Geissler, Olds & Lowe, P.C.

(57) ABSTRACT

Disclosed is a polymer having a chemical formula:

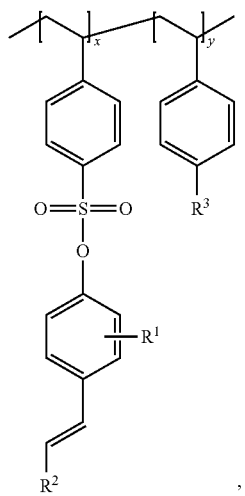

wherein x is 10%~90%, y is 10% to 90%, and x+y=100%; $R^1$ is —H, —$CH_3$, —$CH_2CH_3$, —$OCH_3$, —$O(CH_2)_nCH_3$, wherein n=1~12, —$NH_2$, —$N(CH_3)_2$, $N(CH_2)_nCH_3$, wherein n=1~12, —Br, —Cl, —OH, —$SO_3Na$, —$SO3H$, or —$SO_2Cl$; $R^2$ is —H, —COOH, —$COOCH_3$, —COO$(CH2)_n$ $CH_3$, wherein n=1~12, —$SO_3Na$, —$SO_3H$, —$SO_2Cl$, —OH, —$CONH_2$, —$CON(CH_3)_2$, —$CON(CH_2)_n$ $(CH_3)_2$, wherein n=1~12, —Br, or —Cl; and $R^3$ is —$SO_3Na$, —$SO_3H$, —$PO_3H$, —$SO_2Cl$. —OH, —H, —COOH, —$COOCH_3$, —$COO(CH_2)nCH_3$, wherein n=1~12, —$CONH_2$, —$CON(CH_3)_2$, —$CON(CH_2)_n(CH_3)_2$, wherein n=1~12, —Br, or —Cl.

5 Claims, 3 Drawing Sheets

(51) Int. Cl.
*H01B 1/12* (2006.01)
*C08F 28/00* (2006.01)

(56) References Cited

U.S. PATENT DOCUMENTS

| | | | |
|---|---|---|---|
| 7,446,082 B2 | 11/2008 | Kilkenny et al. | |
| 7,470,652 B2 | 12/2008 | Kilkenny et al. | |
| 7,584,519 B2 | 9/2009 | Ouellette et al. | |
| 7,772,181 B2 | 8/2010 | Amin et al. | |
| 7,785,493 B2 | 8/2010 | Jonas et al. | |
| 7,803,902 B2 | 9/2010 | Amin et al. | |
| 7,947,475 B2 | 5/2011 | Amin et al. | |
| 8,236,288 B2 | 8/2012 | Mehta et al. | |
| 8,394,941 B2 | 3/2013 | Amin et al. | |
| 8,436,068 B2* | 5/2013 | Yang | C08K 5/34922 522/109 |
| 2004/0141936 A1 | 7/2004 | Kropke et al. | |
| 2004/0144406 A1 | 7/2004 | Garabedian et al. | |
| 2004/0244132 A1 | 12/2004 | Ouellette et al. | |
| 2005/0026802 A1 | 2/2005 | Kilkenny et al. | |
| 2005/0079987 A1 | 4/2005 | Cartwright et al. | |
| 2005/0155628 A1 | 7/2005 | Kilkenny et al. | |
| 2005/0155630 A1 | 7/2005 | Kilkenny et al. | |
| 2005/0155631 A1 | 7/2005 | Kilkenny et al. | |
| 2005/0159063 A1 | 7/2005 | Hill et al. | |
| 2005/0164986 A1 | 7/2005 | Mosher et al. | |
| 2005/0217698 A1 | 10/2005 | Mitchell et al. | |
| 2005/0245424 A1 | 11/2005 | Patel et al. | |
| 2006/0128585 A1 | 6/2006 | Adair et al. | |
| 2006/0293205 A1 | 12/2006 | Chung | |
| 2007/0094827 A1 | 5/2007 | Kilkenny et al. | |
| 2007/0166251 A1 | 7/2007 | Dayan et al. | |
| 2007/0191252 A1 | 8/2007 | Kilkenny et al. | |
| 2007/0191253 A1 | 8/2007 | Kilkenny et al. | |
| 2007/0256247 A1 | 11/2007 | Privitera et al. | |
| 2007/0264297 A1 | 11/2007 | Scialdone et al. | |
| 2008/0075684 A1 | 3/2008 | Barg et al. | |
| 2008/0214669 A1 | 9/2008 | Dayan et al. | |
| 2009/0068255 A1 | 3/2009 | Yu et al. | |
| 2009/0098076 A1 | 4/2009 | Barg et al. | |
| 2009/0098079 A1 | 4/2009 | Schiemann et al. | |
| 2009/0099075 A1 | 4/2009 | Barg et al. | |
| 2009/0156485 A1 | 6/2009 | Barg et al. | |
| 2009/0165228 A1 | 7/2009 | Kilkenny et al. | |
| 2010/0015070 A1 | 1/2010 | Bollschweiler et al. | |
| 2010/0031398 A1 | 2/2010 | Lewis et al. | |
| 2010/0092409 A1 | 4/2010 | Amin et al. | |
| 2010/0093028 A1 | 4/2010 | Amin et al. | |
| 2010/0183532 A1 | 7/2010 | Musa et al. | |
| 2010/0221780 A1 | 9/2010 | Amin et al. | |
| 2010/0278882 A1 | 11/2010 | Liebmann et al. | |
| 2010/0330007 A1 | 12/2010 | Spindler et al. | |
| 2011/0020251 A1 | 1/2011 | Shih et al. | |
| 2011/0049432 A1 | 3/2011 | Lee et al. | |
| 2011/0256608 A1 | 10/2011 | Amin et al. | |
| 2011/0293540 A1 | 12/2011 | Musa et al. | |
| 2012/0014885 A1 | 1/2012 | Collier et al. | |
| 2012/0064182 A1 | 3/2012 | Gohla et al. | |
| 2012/0093748 A1 | 4/2012 | Fares et al. | |
| 2012/0148647 A1 | 6/2012 | Walzel et al. | |
| 2012/0177586 A1 | 7/2012 | Mehta et al. | |
| 2012/0225106 A1 | 9/2012 | Ross et al. | |
| 2013/0034510 A1 | 2/2013 | Mehta et al. | |
| 2013/0061414 A1 | 3/2013 | Swist et al. | |

OTHER PUBLICATIONS

Katja Nilles et al.,"Polymerization of an activated ester monomer based on 4-vinylsulfonic acid and its polymer analogous reaction" Polym. Chem., 2, pp. 376-384. 2011.

Shinsaku Fujita et al., "A convenient preparation of Arenesulfonyl chlorides from the sodium sulfonates and phosphoryl chloride/sulfonate", 1982 Georg Thieme Verlag Stuttgart New York, Communication, pp. 423-424.

Michael Howard Karger et al., "Mixed Sulfonic-Carboxylic Anhydrides. I. Synthesis and Thermal Stability. New Syntheses of Sulfonic Anhydrides", J.Org. Chem. vol. 36, No. 4, pp. 528-531. 1971.

Janice M. Klunder et al., "A Convenient Synthesis of Sulfinate Esters from Sulfonyl Chlorides", J. Org. Chem., vol. 52, No. 12, pp. 2599-2602. 1987.

J.S. Yadav et al., "Total Synthesis of Rhoiptelol B", Synthesis, No. 24, pp. 4300-4306. 2010.

* cited by examiner

POLYMER AND CONDUCTIVE COMPOSITION

CROSS REFERENCE TO RELATED APPLICATIONS

This application claims the benefit of U.S. Provisional Application No. 61/865,776 filed on Aug. 14, 2013, claims priority of Taiwan Patent Application No. 102148967, filed on Dec. 30, 2013, and claims priority of Taiwan Paten Application No. 103127727, filed on Aug. 13, 2014, which is a Continuation-In-Part of Taiwan Patent Application No. 102148967, filed on Dec. 30, 2013, the entirety of which is incorporated by reference herein.

TECHNICAL FIELD

The technical field relates to a conductive polymer, and in particular relates to a network structure thereof.

BACKGROUND

Indium tin oxide (ITO) on a flexible substrate will be aged or even curved to form micro-cracks after repeated clicking. For multi-point touch control technology in the future, the requirements of a click lifetime and degree of bending resistance will be continuously increased. As such, a flexible transparent conductive film should be developed to replace brittle ITO film. A conductive polymer, poly(3,4-ethylenedioxythiophene)/poly(styrenesulfonate) (PEDOT:PSS) is one candidate to replace ITO material. The leader in this conductive polymer is Heraeus company, which develops a conductive polymer with a sheet resistance of 100Ω/□ and a transmittance of 90%. However, the chemical resistance of the conductive polymer needs to be greatly improved. The chemical resistance of the PEDOT:PSS film can be improved by adding a binder such as polyurethane or melamine. However, few amount of the binder cannot efficiently increase the chemical resistance of the conductive film. On the other hand, a large amount of the binder will decrease the conductivity of the conductive film.

Accordingly, a novel additive that may increase the chemical resistance but not decrease the conductivity of the conductive film is called-for.

SUMMARY

One embodiment of the disclosure provides a polymer, having the chemical formula:

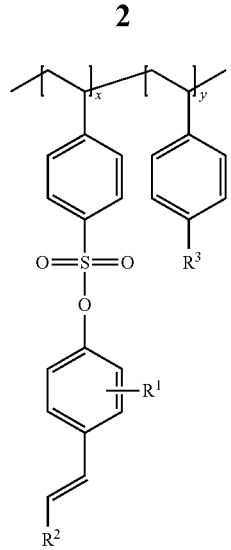

wherein x is a molar percent of 10% to 90%, y is a molar percent of 10% to 90%, and x+y=100%; $R^1$ is —H, —$CH_3$, —$CH_2CH_3$, —$OCH_3$, —$O(CH_2)_nCH_3$, wherein n=1~12, —$NH_2$, —$N(CH_3)_2$, —$N(CH_2)_nCH_3$, wherein n=1~12, —Br, —Cl, —OH, —$SO_3Na$, —$SO_3H$, or —$SO_2Cl$; $R^2$ is —H, —COOH, —$COOCH_3$, —$COO(CH_2)_nCH_3$, wherein n=1~12, —$SO_3Na$, —$SO_3H$, —$SO_2Cl$, —OH, —$CONH_2$, —$CON(CH_3)_2$, —$CON(CH_2)_n(CH_3)_2$, wherein n=1~12, —Br, or —Cl; and $R^3$ is —$SO_3Na$, —$SO_3H$, —$PO_3H$, —$SO_2Cl$, —OH, —H, —COOH, —$COOCH_3$, —COO($CH_2)_nCH_3$, wherein n=1~12, —$CONH_2$, —$CON(CH_3)_2$, —$CON(CH_2)_n(CH_3)_2$, wherein n=1~12, —Br, or —Cl.

One embodiment of the disclosure provides a conductive composition, comprising: a crosslinked network, being crosslinked by the described polymer; and poly(3,4-ethylenedioxythiophene)/poly(styrenesulfonate), wherein the crosslinked network and the poly(3,4-ethylenedioxythiophene)/poly(styrenesulfonate) have a weight of 1:0.01 to 1:0.8.

One embodiment of the disclosure provides a conductive composition, comprising: a crosslinked network, being crosslinked by the described polymer; and poly(3,4-ethylenedioxythiophene), wherein the crosslinked network and the poly(3,4-ethylenedioxythiophene) have a weight ratio of 1:0.2 to 1:0.002.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
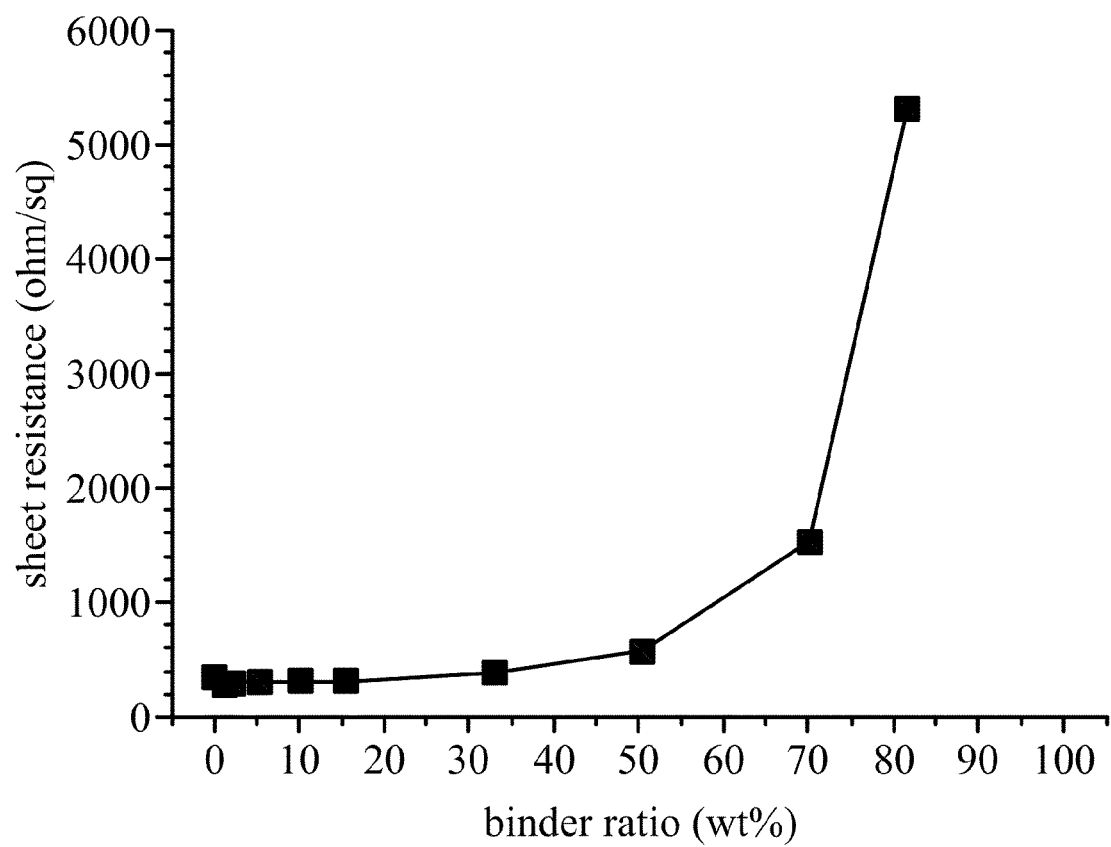
FIG. 1 shows a line chart of sheet resistance versus binder ratio of a conductive film in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a polymer having the chemical formula illustrated in Formula 1.

(Formula 1)

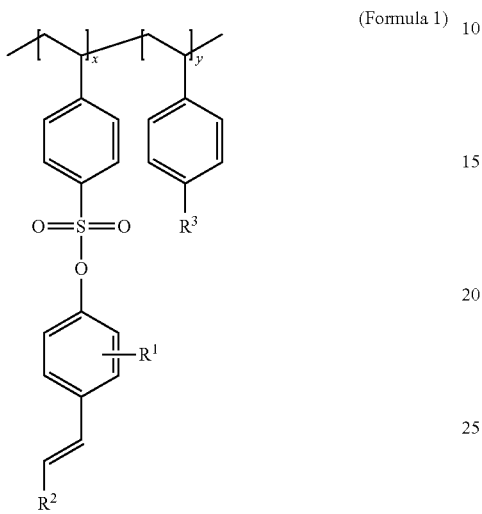

In Formula 1, x is a molar percent of 10% to 90%, y is a molar percent of 10% to 90%, and x+y=100%. $R^1$ is —H, —$CH_3$, —$CH_2CH_3$, —$OCH_3$, —$O(CH_2)_nCH_3$, wherein n=1~12, —$NH_2$, —$N(CH_3)_2$, —$N(CH_2)_nCH_3$, wherein n=1~12, —Br, —Cl, —OH, —$SO_3Na$, —$SO_3H$, or —$SO_2Cl$. $R^2$ is —H, —COOH, —$COOCH_3$, —$COO(CH_2)_n$ $CH_3$, wherein n=1~12, —$SO_3Na$, —$SO_3H$, —$SO_2Cl$, —OH, —$CONH_2$, —$CON(CH_3)_2$, —$CON(CH_2)_n(CH_3)_2$, wherein n=1~12, —Br, or —Cl. $R^3$ is —$SO_3Na$, —$SO_3H$, —$PO_3H$, —$SO_2Cl$, —OH, —H, —COOH, —$COOCH_3$, —$COO(CH_2)_nCH_3$, wherein n=1~12, —$CONH_2$, —CON $(CH_3)_2$, —$CON(CH_2)_n(CH_3)_2$, wherein n=1~12, —Br, or —Cl. The polymer in Formula 1 has an Mw of 45000 to 120000.

In one embodiment, the polymer is prepared as described below. First, potassium styrene sulfonate is chlorinated. The chlorinated compound and an alcohol with a terminal double bond are reacted through a substitution reaction, as shown in Formula 2.

(Formula 2)

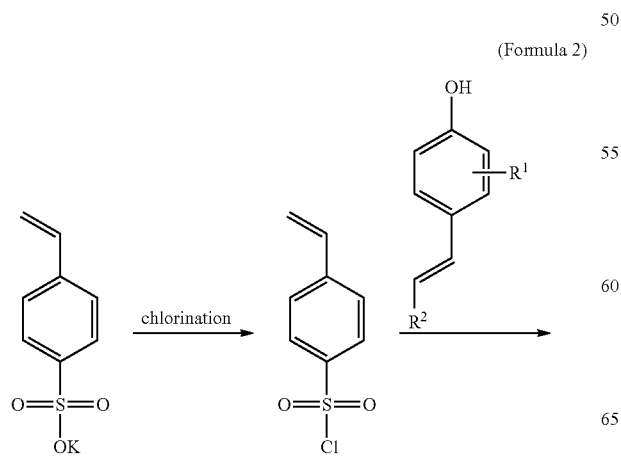

-continued

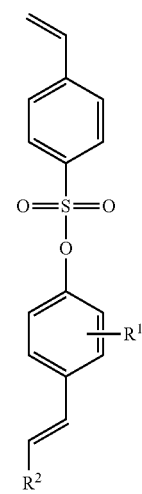

Subsequently, x parts by mole of the product in Formula 2, y parts by mole of styrene with $R^3$ substituent group, and a catalytic amount of radical initiator are reacted through a copolymerization reaction to form the polymer in Formula 1, as shown in Formula 3.

(Formula 3)

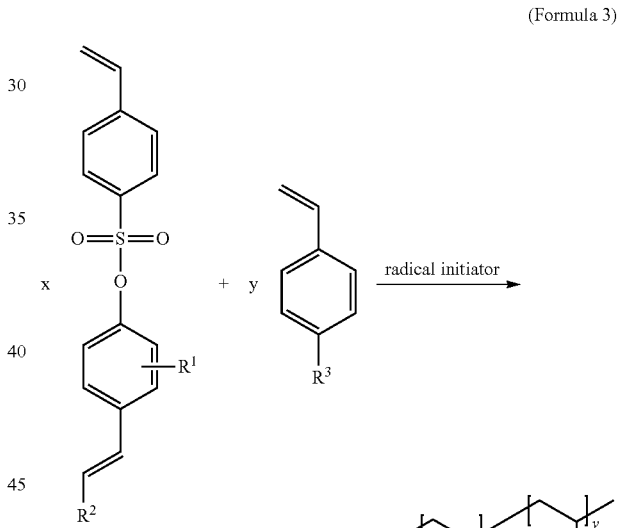

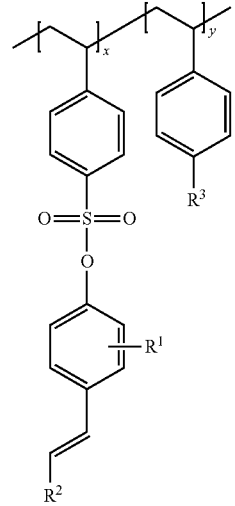

In one embodiment, poly(potassium styrene sulfonate) is chlorinated. The chlorinated polymer and an alcohol with a terminal double bond are reacted through a substitution reaction, as shown in Formula 4.

(Formula 4)

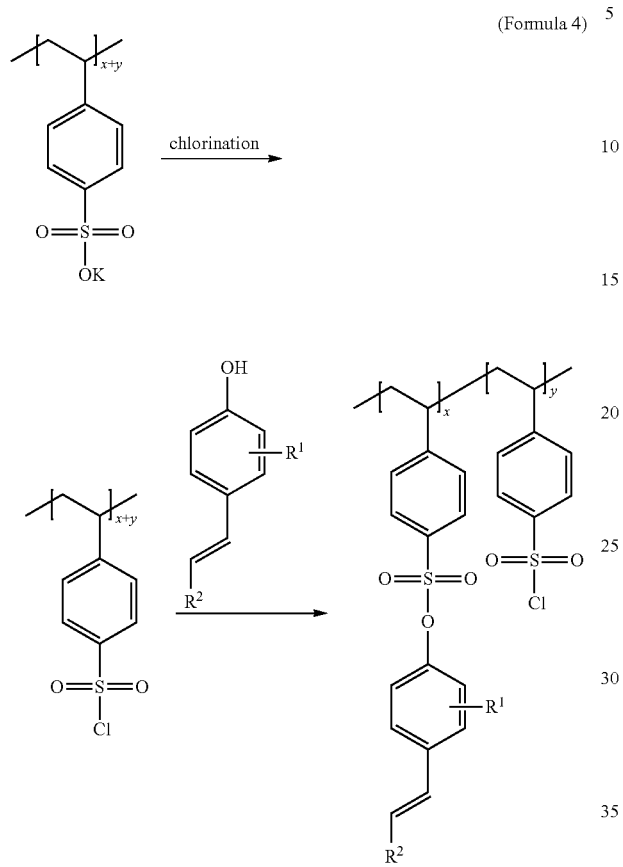

In some embodiments, the product in Formula 4 is reacted with sodium carbonate, as shown in Formula 5.

(Formula 5)

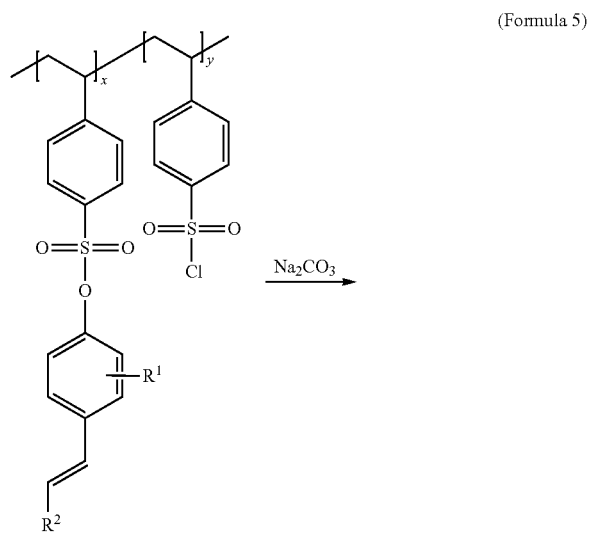

-continued

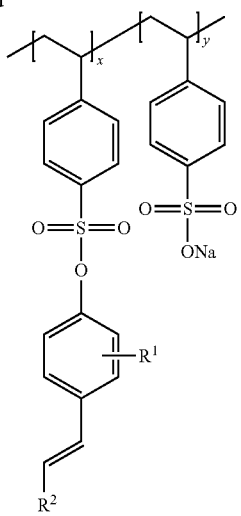

It should be understood that the above reactions are merely some possible synthetic routes. One skilled in the art may modify the above synthetic routes according to his/her laboratory equipments and raw materials, and not limited to the above synthetic routes. In one embodiment, the polymer in Formula 1 is a random polymer.

The polymer in Formula 1 can be mixed with the commercially available PEDOT:PSS. The mixture can be heated or exposed to a light, thereby crosslinking the polymer to form a crosslinked network. The crosslinked network may improve chemical resistance, climate resistance, and thermal resistance of the mixture. The PEDOT:PSS can be a commercially available product, e.g. Heraeus Clevious™ PH1000. The crosslinked network (formed from the polymer) and the PEDOT:PSS have a weight ratio of 1:0.01 to 1:0.8. An overly low ratio of the crosslinked network cannot efficiently improve the chemical resistance of the mixture. An overly high ratio of the crosslinked network may reduce the conductivity of the mixture. Compared to the conventional binder, the polymer in Formula 1 and the PSS have similar (not the same) structures. As such, the polymer in Formula 1 can be evenly mixed with the PEDOT:PSS, and a large amount of the polymer in Formula 1 will not reduce the conductivity of the mixture.

In another embodiment, the polymer in Formula 1 can be directly mixed with the 3,4-ethylenedioxythiophene (EDOT), and the EDOT in the mixture is then polymerized. The polymerization mechanism of the EDOT is different from the crosslink mechanism of the double bonds of the polymers in Formula 1. For example, the EDOT is polymerized at an acidic condition (pH 2 to 3) with a catalyst such as ammonium persulfate and iron sulfate (or iron chloride and hydrochloric acid) to form the PEDOT. After the polymerization of the PEDOT, the mixture can be exposed to light to crosslink the polymer in Formula 1 to form a crosslinked network. In this embodiment, the crosslinked network from the polymer and the PEDOT have a weight ratio of 1:0.2 to 1:0.002. An overly low ratio of the crosslinked network may have a poor dispersity. Compared to conventional PEDOT:PSS, PEDOT: the polymer in Formula 1 has a conductivity similar to the PEDOT:PSS and a better compatibility than the PEDOT:PSS.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

80 g of KOH was dissolved in 200 mL of water. The KOH solution was slowly added into 500 g of a PSSH solution (30% PSSH, MW=75000, commercially available from Alfa Aesar) in an ice bath until a pH value of the PSSH solution reached 9. The mixture was stirred and reacted in the ice bath for 1 hour, and then added to 4000 mL of acetone, thereby re-precipitating a white solid under a yellow liquid. The upper-layered yellow liquid was poured out, and fresh acetone was then added to the white solid and stirred. After the white solid was precipitated, the yellow liquid was poured out again. The acetone washing step was repeated until the liquid was colorless, and the white solid was filtered as PSSK with a yield of 90%. The above reaction is shown in Formula 6, and the spectra data of the PSSK are shown as below: $^1$H NMR (500 MHz, H2O-d2): δ (ppm)=7.76-7.25 (br, 2H,) 6.71-6.01 (br, 2H), 1.0-1.48 (br, 3H). IR (Air): 1599, 1491, 1453, 1414, 1183, 1126, 1036, 1006, 830 cm$^{-1}$.

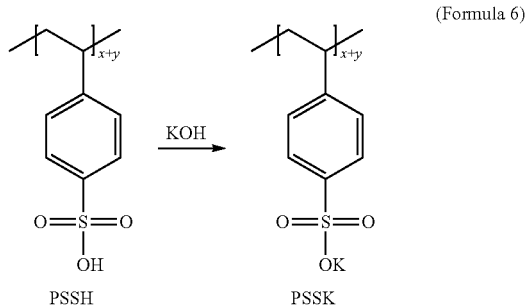

(Formula 6)

Subsequently, 20 g of the PSSK was put into a three-necked bottle (1000 mL), and a condenser was set on the bottle. The bottle was heated to 65° C. in an oil bath and evacuated for 2 hours. Thereafter, sulfolane was heated to 60° C. in a water bath. 50 mL of the sulfolane was added to 50 mL of anhydrous acetonitrile to be evenly stirred. The sulfolane was added to the PSSK in the bottle, and then heated to 80° C. 36.5 mL of POCl$_3$ was then added to the PSSK solution to react at 80° C. for 2 hours. The reaction result was added to ice water to re-precipitate a white solid PSSCl. The PSSCl was filtered to be dried, and further evacuated to remove residue water thereof. The above reaction is shown in Formula 7, and the spectra of the PSSCl are shown as below: $^1$H NMR (500 MHz, DMSO-d6): δ (ppm)=7.71-7.04 (s, 2H), 6.98-6.0 (s, 2H), 1.9-0.81 (s, 3H). IR (Air): 1593, 1490, 1453, 1413, 1373, 1296, 1168, 1036, 1006, 836 cm$^{-1}$.

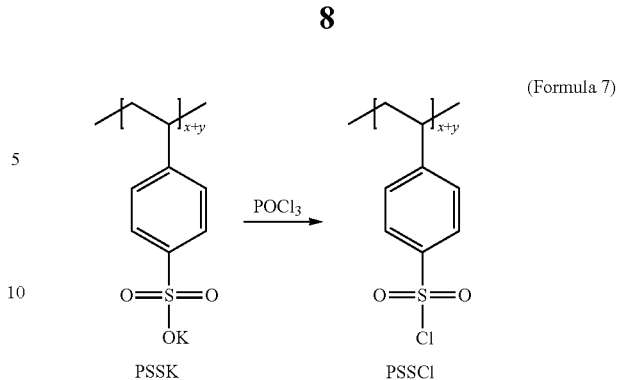

(Formula 7)

Subsequently, 2.7 g of the PSSCl was put into a two-necked bottle (250 mL), and the bottle was evacuated for 30 minutes. 20 mL of anhydrous acetonitrile and 8 mL of sulfolane were added to the PSSCl in the bottle in an ice bath to be evenly stirred. The bottle containing the PSSCl solution was then purged with nitrogen. 2.7 g of ethyl ferulate was put into another two-necked bottle (250 mL) and then evacuated for 30 minutes. 20 mL of anhydrous acetonitrile and 8 mL of triethyl amine was added to the ethyl ferulate to be evenly stirred. The bottle containing the ethyl ferulate solution was then purged with nitrogen. The ethyl ferulate solution was extracted by a syringe, and then dropwise injected to the PSSCl solution under nitrogen in an ice bath. The ice bath was then removed, the two-necked bottle was returned to room temperature, and the mixture in the bottle was stirred and reacted for 24 hours. The reaction result was added to 1000 mL of methanol to re-precipitate a white solid. Most of the liquid in the re-precipitation was removed by a centrifugal machine, and the remaining re-precipitation was filtered to obtain a white solid PSCl-FRE. The above reaction is shown in Formula 8, wherein x and y have a ratio of 0.83 to 0.17. The spectra of the PSCl-FRE are shown as below: $^1$H NMR (500 MHz, acetone-d6): δ (ppm)=8.0-6.29 (m, 10H), 4.23-4.04 (s, 2H), 3.75-3.33 (s, 3H), 2.16-1.39 (m, 3H), 1.34-1.14 (s, 3H,). IR (Air): 965, 1706, 1637, 1959, 1505, 1459, 1417, 1370, 1260, 1176, 1153, 1119, 1092, 1034, 984, 852 cm$^{-1}$.

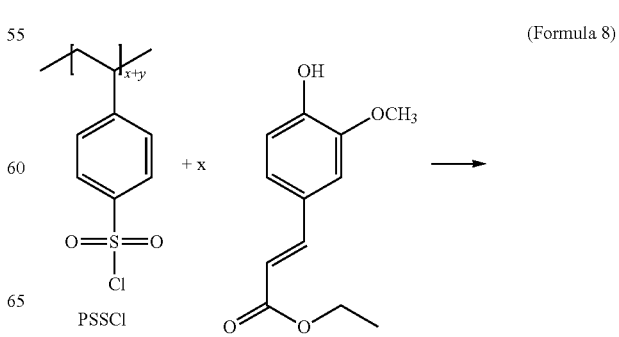

(Formula 8)

-continued

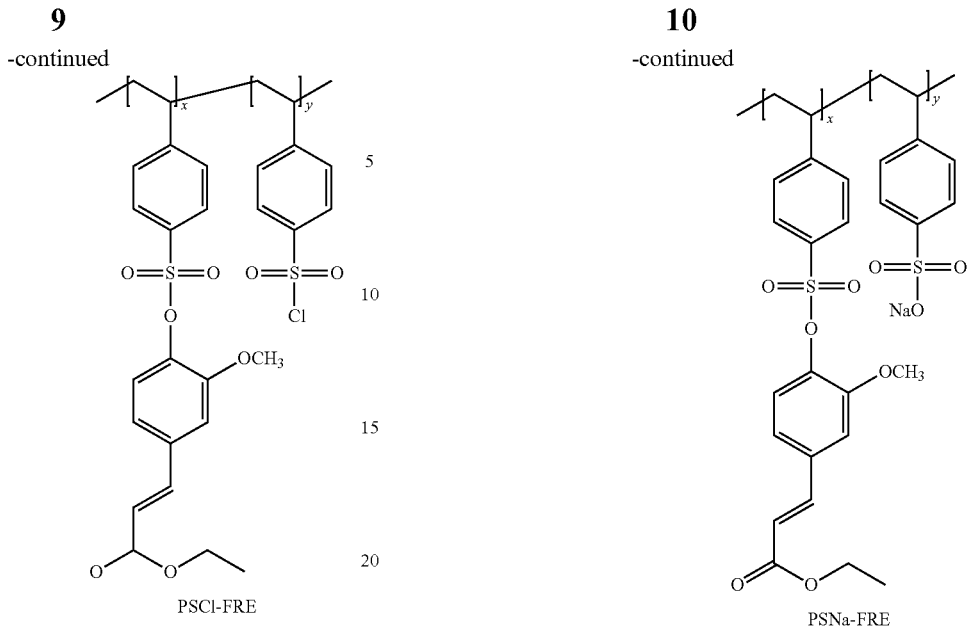

PSCl-FRE 2.8 g of the PSCl-FRE was dissolved in 10 mL of THF. 0.9 g of $Na_2CO_3$ was dissolved in 70 mL of THF, and the $Na_2CO_3$ solution was added to the PSCl-FRE solution in an ice bath. The mixture was stirred to room temperature, and then stirred and reacted at room temperature for 24 hours. The reaction result was added to methanol to be re-precipitated. The re-precipitation was centrifugalized 2 times to remove small molecular impurities, and then filtered to be dried for obtaining PSNa-FRE. The above reaction is shown in Formula 9, wherein x and y have a ratio of 0.77:0.23. The spectra of the PSNa-FRE are shown as below: $^1$H NMR (500 MHz, dmso-d6): δ (ppm)=8.0-6.4 (m, 10H), 4.2-3.9 (s, 2H), 3.65-3.43 (s, 3H), 2.10-1.20 (b, 3H), 1.24-0.85 (s, 3H). IR (Air): 937, 1707, 1637, 1595, 1501, 1463, 1417, 1371, 1257, 1177, 1155, 1117, 1091, 1036, 979, 849 $cm^{-1}$.

(Formula 9)

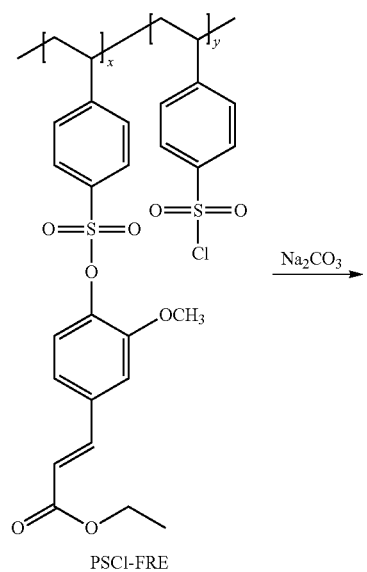

PSCl-FRE

-continued

PSNa-FRE

Example 2

2.8 g of the PSSCl was put into a two-necked bottle (250 mL), and the bottle was evacuated for 30 minutes. 20 mL of anhydrous acetonitrile and 8 mL of sulfolane were added to the PSSCl in the bottle in an ice bath to be evenly stirred. The bottle containing the PSSCl solution was then purged with nitrogen. 2.6 g of ferulic acid was put into another two-necked bottle (250 mL) and then evacuated for 30 minutes. 20 mL of anhydrous acetonitrile and 8 mL of triethyl amine was added to the ethyl ferulate to be evenly stirred. The bottle containing the ferulic acid solution was then purged with nitrogen. The ferulic acid solution was extracted by a syringe, and then dropwise injected to the PSSCl solution under nitrogen in an ice bath. The ice bath was then removed, the two-necked bottle was returned to room temperature, and the mixture in the bottle was stirred and reacted for 24 hours. The reaction result was added to 1000 mL of methanol to re-precipitate a white solid. Most of the liquid in the re-precipitation was removed by a centrifugal machine, and the remaining re-precipitation was filtered to obtain a white solid PSCl-FRA. The above reaction is shown in Formula 10, wherein x and y have a ratio of 0.18:0.82. The spectra of the PSCl-FRA are shown as below: $^1$H NMR (500 MHz, DMSO-d6): δ (ppm)=8.2-6.21 (m, 10H), 3.75-4.06 (s, 3H), 2.24-1.23 (m, 3H). IR (Air): 3005, 2701, 1706, 1634, 1595, 1506, 1460, 1414, 1374, 1176, 1123, 1035, 1009, 858 $cm^{-1}$.

(Formula 10)

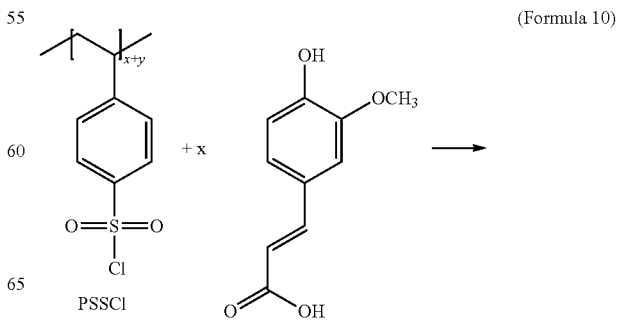

PSSCl

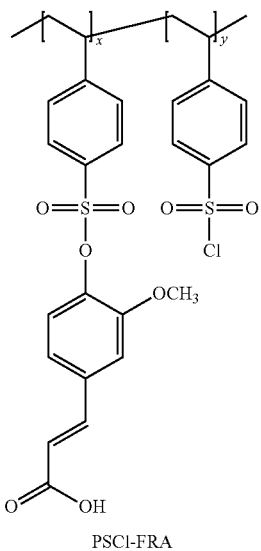

PSCl-FRA

Example 3

2 g of PEDOT:PSS solution (Synthesis according to EP 440957B1 and U.S. Pat. No. 5,300,575A) was weighted as a basis. 0.04 wt % of surfactant (FS300, commercially available from Aldrich), 5 wt % of DMSO, and different weight % of binder (NP57, polyurethane commercially available from NanPao resin company) were added to the PEDOT:PSS and then evenly mixed. The mixture was coated and dried to form a film with a thickness of 100 nm to 300 nm. The sheet resistances of the films containing different weight ratios of NP57 are shown in FIG. 1. The sheet resistances of the films were measured according to ASTM-D257. As shown in FIG. 1, when the additive amount of the NP57 was greater than 50 wt %, the sheet resistance of the film was greatly increased.

Example 4

Figure 2:
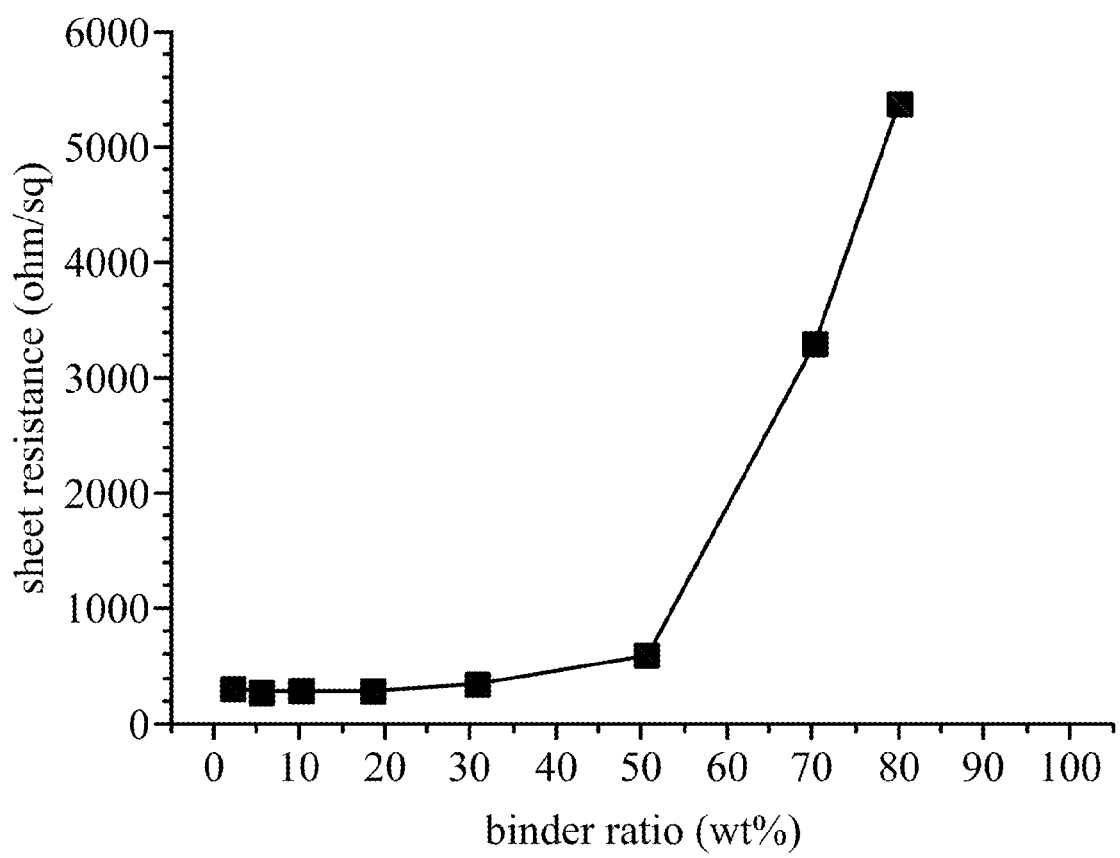
FIG. 2 shows a line chart of sheet resistance versus binder ratio of a conductive film in one embodiment of the disclosure.

2 g of PEDOT:PSS solution (Synthesis according to EP 440957B1 and U.S. Pat. No. 5,300,575A) was weighted as a basis. 0.04 wt % of surfactant (FS300, commercially available from Aldrich), 5 wt % of DMSO, and different weight % of binder (50-WT, melamine commercially available from Chung-Chang Chun resin company) were added to the PEDOT:PSS and then evenly mixed. The mixture was coated and dried to form a film with a thickness of 100 nm to 300 nm. The sheet resistances of the films containing different weight ratios of 50-WT are shown in FIG. 2. The sheet resistances of the films were measured similar to Example 1. As shown in FIG. 2, when the additive amount of the 50-WT was greater than 50 wt %, the sheet resistance of the film was greatly increased.

Example 5

Figure 3:
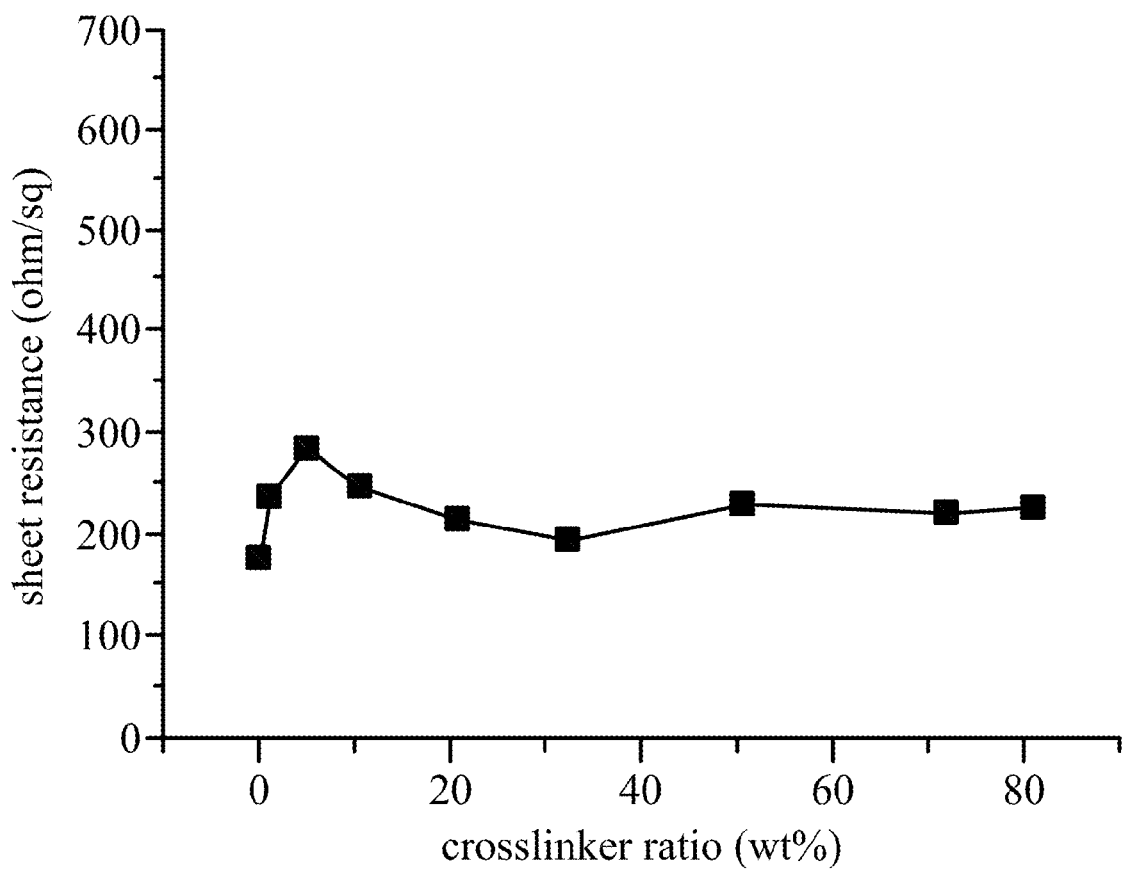
FIG. 3 shows line chart of sheet resistance versus crosslinker ratio of a conductive film in one embodiment of the disclosure.

2 g of PEDOT:PSS solution (Synthesis according to EP 440957B1 and U.S. Pat. No. 5,300,575A) was weighted as a basis. 0.04 wt % of surfactant (FS300, commercially available from Aldrich), 5 wt % of DMSO, and different weight % of crosslinker (the PSCl-FRE in Formula 8 of Example 1) were added to the PEDOT:PSS and then evenly mixed. The mixture was exposed to a light to crosslink the PSCl-FRE for forming a crosslinked network, and the exposed mixture was coated and dried to form a film with a thickness of 100 nm to 300 nm. The sheet resistances of the films containing different weight ratios of PSCl-FRE are shown in FIG. 3. The sheet resistances of the films were measured similar to Example 1. As shown in FIG. 3, when the additive amount of the 50-WT was increased to 70 wt %, the sheet resistance of the film would be similar to the film without the PSCl-FRE.

Example 6

2 g of PEDOT:PSS solution (PH1000, commercially available from Heraues) was coated and dried to form a film with a thickness of 100 nm to 300 nm. The film was put at 85° C. for 72 hours to measure its sheet resistance change ratio (compared to the sheet resistance of the film before the thermal treatment), and then put at 100° C. for 60 hours to measure its sheet resistance change ratio (compared to the sheet resistance of the film before the thermal treatment).

2 g of PEDOT:PSS solution (PH1000, commercially available from Heraues) was weighted as a basis. 0.04 wt % of surfactant (FS300, commercially available from Aldrich), 5 wt % of DMSO, and 70% of crosslinker (the PSCl-FRE in Formula 8 of Example 1) were added to the PEDOT:PSS and then evenly mixed. The mixture was exposed to a light to crosslink the PSCl-FRE for forming a crosslinked network, and the exposed mixture was coated and dried to form a film with a thickness of 100 nm to 300 nm. The film was put at 85° C. for 72 hours to measure its sheet resistance change ratio (compared to the sheet resistance of the film containing the PSCl-FRE before the thermal treatment), and then put at 100° C. for 60 hours to measure its sheet resistance change ratio (compared to the sheet resistance of the film containing the PSCl-FRE before the thermal treatment). As shown in Table 1, the film containing the PSCl-FRE had a higher thermal resistance than the film without the PSCl-FRE.

TABLE 1

| | Sheet resistance change ratio of the PH1000 film | Sheet resistance change ratio of the PH1000 + PSCL-FRE film |
|---|---|---|
| Before thermal treatment | — | — |
| After 85° C. thermal treatment | 12.72% | 10.24% |
| After 100° C. thermal treatment | 21.20% | 17.27% |

Example 7

2 g of PEDOT:PSS solution (PH1000, commercially available from Heraues) was coated and dried to form a film with a thickness of 100 nm to 300 nm. The film was sealed by glass and UV glue to form a sample. The sample was put at high temperature (85° C.) under high humidity (RH 85) for 60 hours to measure its sheet resistance change ratio (compared to the sheet resistance of the sample before the high temperature/high humidity test).

2 g of PEDOT:PSS solution (PH1000, commercially available from Heraues) was weighted as a basis. 0.04 wt % of surfactant (FS300, commercially available from Aldrich), 5 wt % of DMSO, and 70% of crosslinker (the PSCl-FRE in Formula 8 of Example 1) were added to the PEDOT:PSS and then evenly mixed. The mixture was exposed to a light to crosslink the PSCl-FRE for forming a crosslinked network, and the exposed mixture was coated and dried to form a film with a thickness of 100 nm to 300 nm. The film was sealed by glass and UV glue to form a sample. The sample was put at high temperature (85° C.) under high humidity (RH 85) for 60 hours to measure its sheet resistance change ratio (compared to the sheet resistance of the sample before the high temperature/high humidity test). As shown in Table 2, the film containing the PSCl-FRE had a better high temperature/high humidity resistance than the film without the PSCl-FRE.

TABLE 2

|  | Sheet resistance change ratio of the PH1000 film | Sheet resistance change ratio of the PH1000 + PSCL-FRE film |
|---|---|---|
| Before the high temperature/high humidity test | — | — |
| After the high temperature/high humidity test | 55.64% | 47.46% |

Example 8

1) 70 mL of acetone and 35 g of water were mixed in a 500 mL two-necked bottle and purged by nitrogen for 30 minutes.

2) 2.8 g of PSCl-FRE (0.17:0.83) and 0.1 g of 3,4-ethylenedioxythiophene (EDOT, commercially available from Synmax Biochemical) was sequentially dissolved in 7 mL of acetone.

3) The acetone solution in step 2) was added into the 500 mL two-necked bottle under nitrogen.

4) 1.7 g of $Na_2S_2O_8$ (commercially available from aldrich) was dissolved in 5 g of water, and then added into the 500 mL two-necked bottle to be stirred for 10 minutes.

5) 0.025 g of $Fe_2(SO_4)_3$ powder (commercially available from Aldrich) was mixed with 5 g water, and then added into the 500 mL two-necked bottle under nitrogen to be stirred for 24 hours.

6) The result of the above reaction in the bottle was black and viscous. The result was washed by water and filtered to remove salt therein. The purified product (PEDOT:PSH-FRE) could be dissolved in acetone and ethyl acetate. The above reaction is shown in Formula 11.

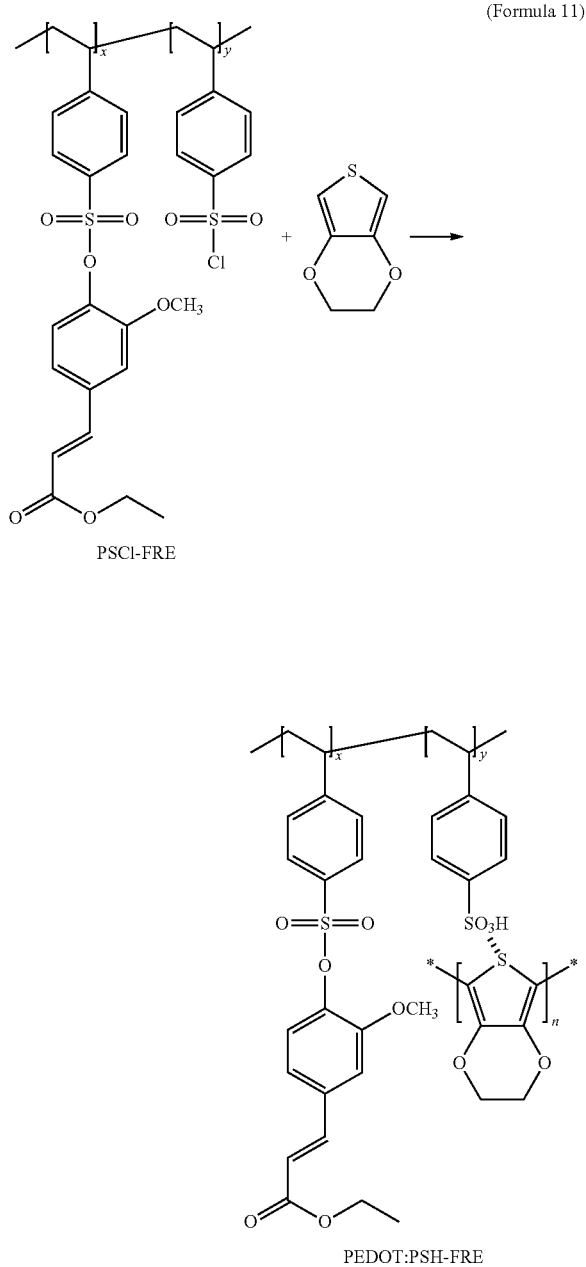

(Formula 11)

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A polymer, having the chemical formula:

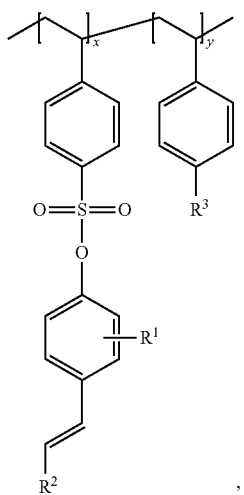

wherein x is a molar percent of 10% to 90%, y is a molar percent of 10% to 90%, and x+y=100%;
$R^1$ is —$OCH_3$ or —$O(CH_2)_nCH_3$, wherein n=1~12;
$R^2$ is —COOH, —$COOCH_3$, or —$COO(CH_2)_nCH_3$, wherein n=1~12; and
$R^3$ is —$SO_3Na$, —$SO_3H$, or —$SO_2Cl$.

2. The polymer as claimed in claim 1, having a Mw of 45000 to 120000.

3. The polymer as claimed in claim 1, having the chemical formula:

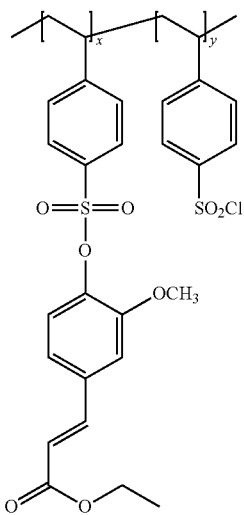

4. The polymer as claimed in claim 1, having the chemical formula:

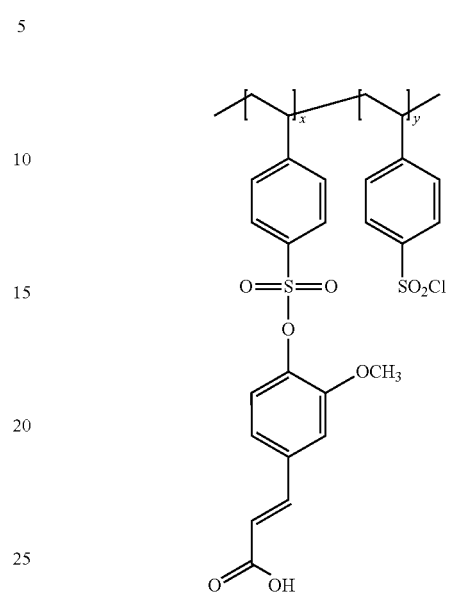

5. The polymer as claimed in claim 1, having the chemical formula:

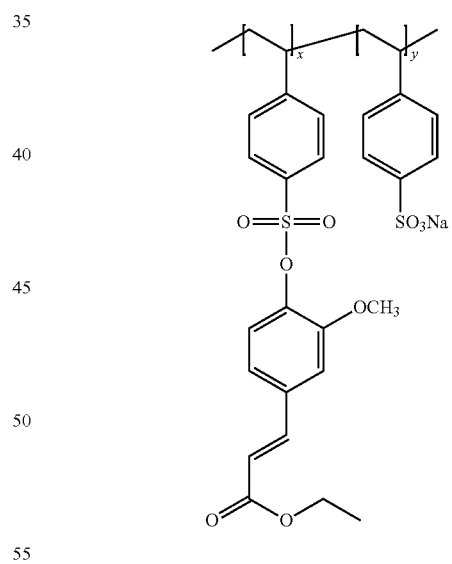

* * * * *